3,334,844
CONTROL POSITION INDICATOR FOR USE WITH GYRO INSTRUMENTS OR THE LIKE
Herman C. Gallaher, Wenatchee, Wash., and John J. Gallaher, Houston, Tex., assignors to Positive Flight Control, Inc., Seattle, Wash., a corporation of Washington
Filed Apr. 20, 1965, Ser. No. 449,414
8 Claims. (Cl. 244—75)

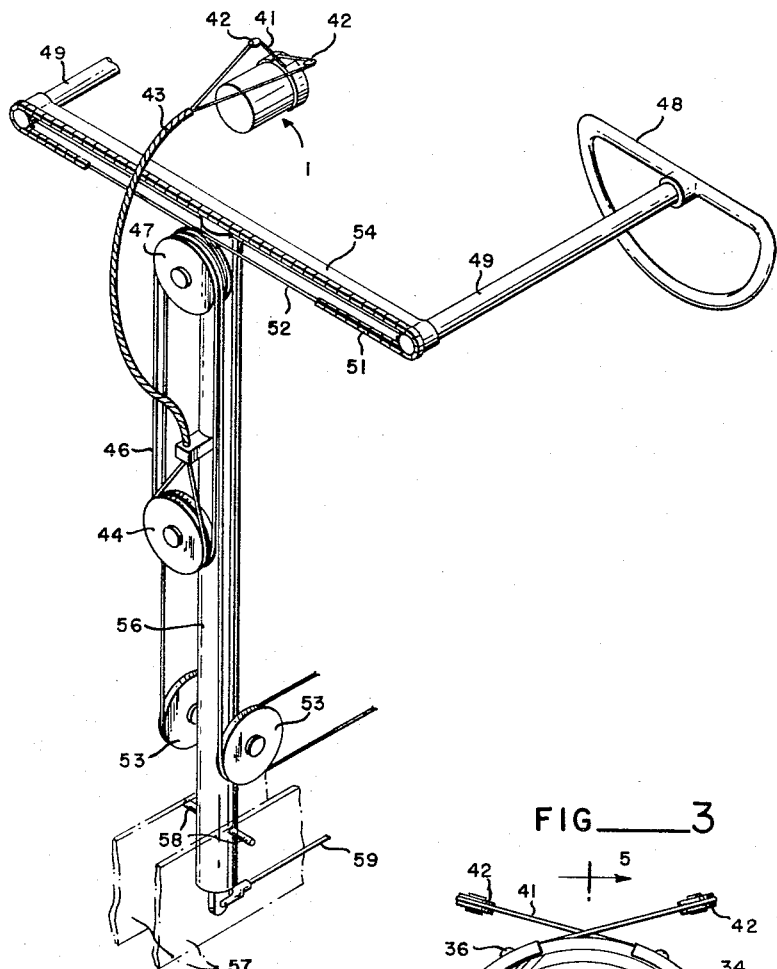
FIG__1
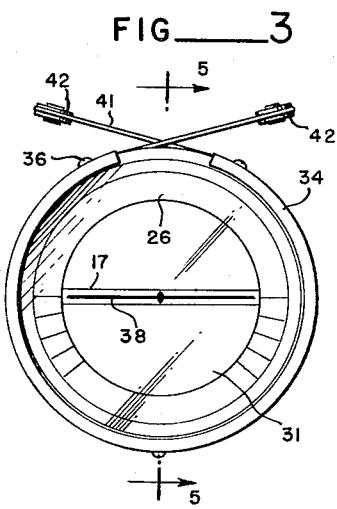
FIG__3
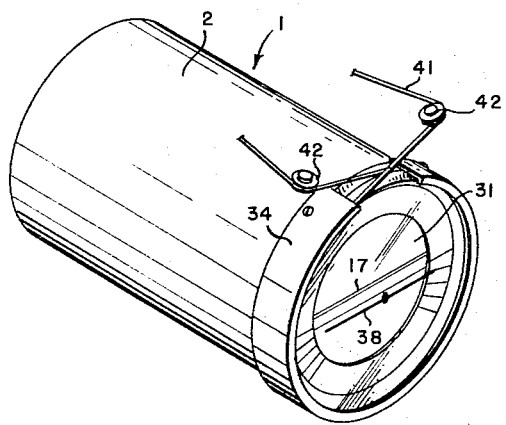
FIG__2
JOHN J. GALLAHER
HERMAN C. GALLAHER
INVENTORS
BY Seed & Berry
ATTORNEYS Aug. 8, 1967   H. C. GALLAHER ET AL   3,334,844
CONTROL POSITION INDICATOR FOR USE WITH
GYRO INSTRUMENTS OR THE LIKE
Filed April 20, 1965   3 Sheets-Sheet 2
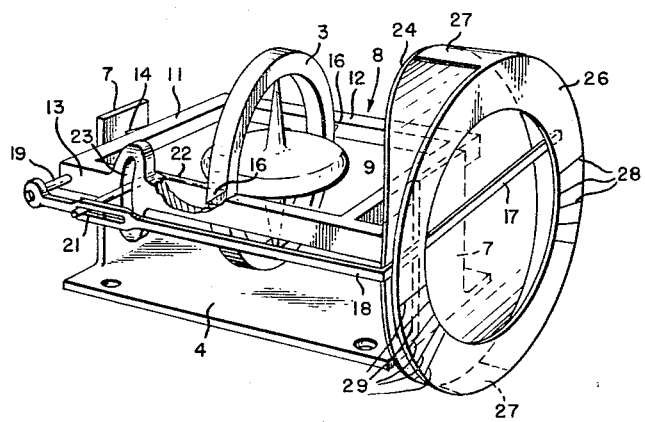
FIG__4
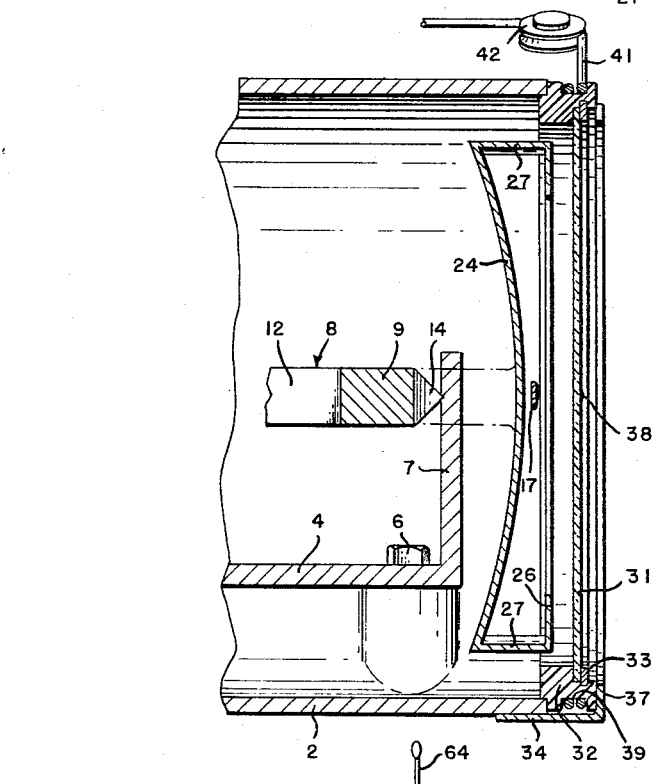
FIG__5
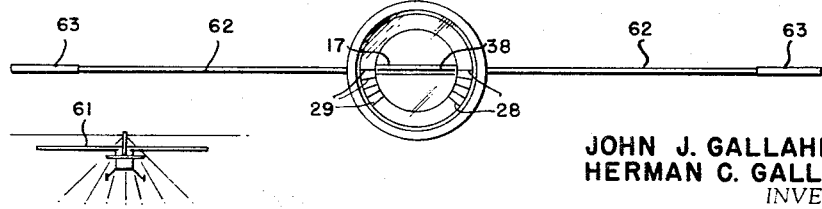
FIG__6
JOHN J. GALLAHER
HERMAN C. GALLAHER
INVENTORS
BY Seed & Berry
ATTORNEYS Aug. 8, 1967  H. C. GALLAHER ET AL  3,334,844
CONTROL POSITION INDICATOR FOR USE WITH
GYRO INSTRUMENTS OR THE LIKE
Filed April 20, 1965  3 Sheets-Sheet 3
FIG.__7
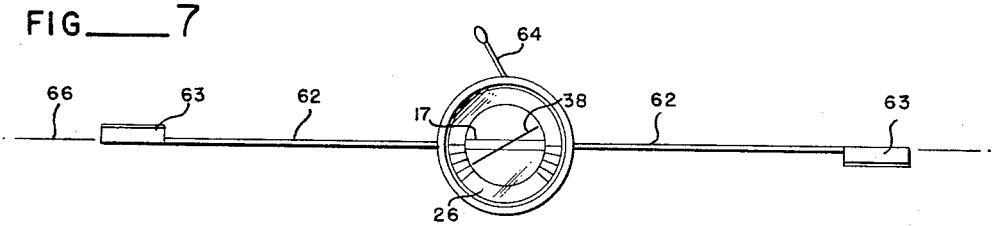
FIG.__8
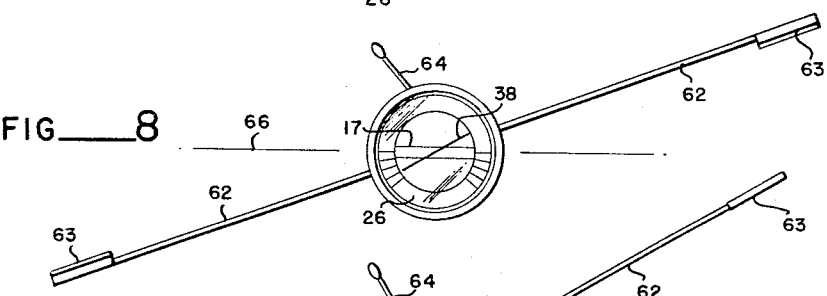
FIG.__9
FIG.__10
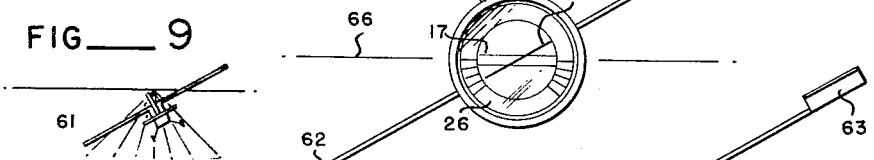
FIG.__11
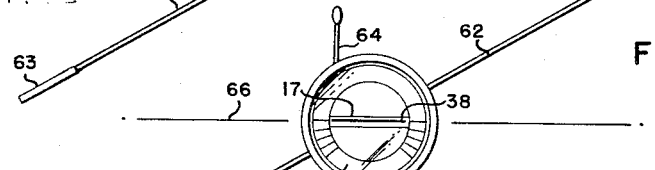
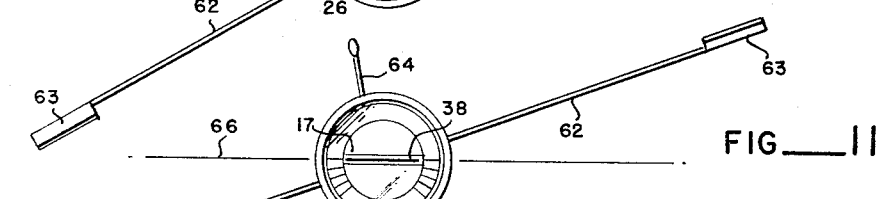
FIG.__12
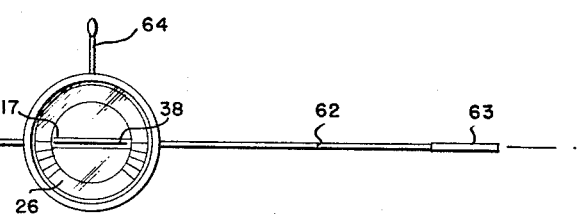
JOHN J. GALLAHER
HERMAN C. GALLAHER
INVENTORS
BY *Seed & Berry*
ATTORNEYS United States Patent Office 3,334,844
Patented Aug. 8, 1967

This invention relates generally to attitude control instruments and more particularly to an instrument adapted to aid a pilot in properly controlling the roll attitude of an airplane as well as the pitch thereof.

The present application is a continuation-in-part of my copending United States application Ser. No. 280,687, filed May 15, 1963, now Patent No. 3,228,631.

In instrument flying, the pilot generally uses an instrument called a "gyro horizon," which provides an artificial horizon in the window of the instrument. A miniature plane is fixedly mounted in the front of the window with its wings always parallel to the wings of the airplane itself. When the plane is banked, the miniature plane appears to the pilot to be horizontal and the artificial horizon to be tilted, as the horizon itself would appear to the pilot. If the pilot desires to level the plane from a banked position, he turns the aileron controls in a manner to rotate the plane in a direction opposite to that in which the artificial horizon will rotate the instrument as the plane is returning to level flight. When the artificial horizon reaches a position paralleling the wing line of the miniature plane in the window, the plane itself has reached a level position with respect to roll attitude.

It is well known that when a plane is banked so as to travel a curved path, the resultant force of the pull of gravity and of the centrifugal force created by the curved path of the airplane is exerted on a line whose direction is nearly parallel to the vertical axis of the plane itself. Thus, even though the plane may be sharply banked, the pilot has the false sensation that he is in level flight, and the miniature airplane in the instrument seems to be maintaining a level attitude with respect to the earth's gravity, while the artificial horizon appears to be tilted with respect to the earth below. The novice in instrument flying sometimes makes the error (as occasionally does the pilot of longer experience) of confusing the attitude of the artificial horizon for the roll attitude of his airplane and in attempting to correct this roll will actually move his controls so as to bank the plane even further. He will not be able to recognize this error until change in roll attitude of the airplane has actually begun so that the artificial horizon can be seen to move to an even greater angle with respect to the miniature plane of the instrument window, the result of this error sometimes being loss of control of the plane.

There is the related problem that, even with the pilot turning the controls in the right direction, this pilot, if inexperienced, will tend often to "over control" the airplane. That is, as the plane approaches level attitude, its momentum will carry beyond a level roll attitude so that the plane becomes banked moderately in the opposite direction. The result is that the novice, while trying to bring his plane to a stable position of level flight, will be operating his controls in a manner to rock his plane about its longitudinal axis.

Accordingly, it is an object of the present invention to provide an instrument which will better enable a pilot to control the attitude of his vehicle.

More particularly, it is an object of the invention to provide an instrument especially adapted for use in controlling the roll attitude of an airplane, by which instrument the pilot is readily able to ascertain the proper direction in which to move his controls, and by which the pilot is able to ascertain immediately and continuously the degree to which he should move his controls to properly bring the plane to the desired roll attitude without any "over-control" of the plane.

Another object of the invention is to better enable the pilot to control the pitch, as well as the roll of his airplane.

A still further object of the present invention is to provide an improved indicator attachment for a gyro instrument or the like which enables the pilot to accurately set and hold a given degree of bank by merely moving the controls of the airplane to bring an indicator line to a graduated degree of bank and to hold the line in a fixed position by gradually returning the controls to a neutral position.

These and other objects and advantages will appear and be understood from the following description and claims, the invention consisting in the novel construction and adaptation and combination of parts hereinafter described and claimed.

Reference is made to the drawings in which:

FIG. 1 is a perspective view illustrating the invention in operating position in the control system of an airplane;

FIG. 2 is a perspective view of the indicator portion of an instrument embodying preferred teachings of the invention;

FIG. 3 is a front elevational view thereof;

FIG. 4 is a perspective view of a gyro instrument and attachments;

FIG. 5 is a longitudinal sectional view of the front indicator portion of the instrument taken along lines 5—5 of FIG. 3; and FIGS. 6 to 12 are a series of schematic illustrations showing the operation of the invention throughout conventional banking maneuvers of an airplane.

Referring to the accompanying drawings, a gyro horizon instrument is indicated generally at 1 in FIG. 2. The housing 2 of this instrument contains the gyroscopic mechanism which is shown in detail in FIGS. 4 and 5. The gyroscopic mechanism according to the present invention includes a conventional gyroscope 3 the function of which is to maintain a fixed reference in space regardless of the relative position of the surrounding frame mechanism as will be well understood by those skilled in the art. As is conventional, the gyroscope 3 is provided with a base frame 4 which is securely fixed to the instrument housing 2 by means of bolts or the like 6 as indicated in FIG. 5. The frame 4 includes upright end posts 7 for the purpose of pivotally supporting a rectangular frame 8. The frame 8 includes front and rear transverse cross members 9 and 11 respectively and longitudinal beams 12 and 13. The frame 8 is supported for pivotal movement on its longitudinal axis about the fixed frame 4 by means of needle point pivot bearings 14 on either end of the frame. The gyroscope itself is pivotally mounted for rotation about the transverse axis of the frame 8 by means of a second set of needle point pivot bearings 16. The gyroscope 3 may be driven by electrical means or any other conventional means (not shown). With this arrangement, it will be seen that, when the housing and the stationary base 4 are rotated about the longitudinal axis of the instrument, the frame 8 and the gyroscope 3 will remain in a stationary position. Likewise, rotation of the instrument housing 2 about the transverse axis of the instrument results in rotation of the frame 4 and the frame 8 about the pivots 16.

According to the present invention, a gyro horizon bar 17 extends across the front face of the instrument and is connected to a rearwardly extending arm 18 which is pivotally connected at a point adjacent one end of the cross member 11 on the pivot pin 19. The arm 18 includes an elongated slot 21 through the rear portion thereof having a sliding engagement with an angularly shaped rod 22 fixed to the gyroscope 3 as shown in FIG. 4. The rod 22 passes through an arcuate slot 23 in the longitudinal beam 13. This structure enables the horizon bar 17 to remain fixed with the frame 8 when the instrument casing and base frame 4 are rotated about the longitudinal axis of the instrument and enables the horizon bar to remain fixed with the gyroscope 3 so as to reflect vertical movement when the instrument is tilted forwardly or rearwardly as would be the case during ascent and descent of the aircraft. The bar 17 thus gives an indication of the pitch attitude of the aircraft.

Rigidly fixed to the forward end of the longitudinal beam 13 is a curved circular plate 24 which lies directly in back of the horizon bar 17 and is so shaped to allow the bar 17 to move in a vertical arc to reflect the longitudinal tilting of the frame about the gyroscope 3. Located in front of the plate 24 and the horizon bar 17 is a flat circular indicator ring 26 which is fixed to the plate 24 by means of the connector members 27. The ring 26 is graduated on both sides as indicated at 28 and 29 with the graduations 28 and 29 being spaced downwardly from the position of the horizon bar 17 when the instrument is in the level position. As will be obvious, the graduated ring 26 rotates with the horizon bar 17 about the longitudinal axis of the instrument but the bar 17 may move vertically with respect to the ring upon forward and rearward tilting of the instrument. The operation of the gyro horizon is such that, regardless of the roll attitude of the airplane, the horizon bar 17 remains parallel to the earth horizon and either drops or rises in the instrument window depending upon whether the airplane is in a climbing or descending pitch attitude.

Our invention further provides a circular transparent indicator plate 31 shown in cross section in FIG. 5 which is fixedly secured to a circular border frame 32 by means of a snap ring 33. The border frame 32 is rotatably mounted at the front of the gyro horizon bar 17 and ring 26 at a location where the window thereof would ordinarily be placed. This mounting is conveniently accomplished with a mounting sleeve 34 screw fastened as at 36 to the front of the instrument housing 2 and extending forwardly a short distance therefrom where it terminates in an inturned circumferential lip 37 to engage the frame 32 to hold the indicator plate 31 in front of the horizon bar 17. Marked across the face of the plate 31 and through the approximate center thereof is a reference line 38 whose angular position corresponds to the position of the aileron controls of the airplane by means presently to be described.

The angular positioning of the reference line 38 is readily accomplished by forming the peripheral frame 32 of the indicator plate 31 with a circumferential groove 39 to accommodate a control cable 41 which is looped one or more times about the circumference of the frame so as to frictionally engage the same. Each side of the cable loop reaches away from the groove 39 of the frame at the upper portion thereof, each to train over a respective guide pulley 42—42 and into a flexible tube 43, then to circle around an instrument control pulley 44 shown in FIG. 1.

The control pulley 44 is connected by a belt 46 to another pulley, such as the one shown at 47, this latter pulley being part of a conventional aileron control mechanism used in smaller aircraft. This aileron control mechanism, as shown herein in FIG. 1, comprises a set of steering handles, one of which is shown at 48, the shafts 49 of which engage through a chain and sprocket mechanism 51 an aileron control cable 52. The cable 52 loops about the pulley 47 and trains about guide pulley 53 and then operatively engages each of the ailerons (not shown) of the airplane. Thus it can readily be seen that when either of the control handles 48 are turned so as to rotate the pulley 47 and move the ailerons of the airplane by means of the cable 52, the belt 46 also turns the instrument control pulley 44 to cause a corresponding rotation of the indicator plate 31. It is to be understood, of course, that our invention can be applied equally well to other such types of control apparatus, and that means other than the control cable mechanism shown herein may be used to make the indicator plate 31 responsive to the aileron controls, without departing from the broader aspects of our invention.

Control of the elevators of the plane is accomplished in a conventional manner by journaling the shafts 49 of the handles 48 in a cross bar 54 which is fixed to a post 56. The post 56 is swing mounted by its lower end about a transverse horizontal axis to the frame 57 of the airplane as by pins 58. The extreme lower end of the post is connected to the elevators (not shown) through a cable 59 in a manner that, by moving the handles 48 forward and backward, the plane is caused to be placed in a descending or climbing attitude.

FIGS. 6 through 12 illustrate schematically the operation of the invention in an airplane making a conventional turn. For clarity, FIGS. 6 and 9 are supplemented with sketches showing at 61 an airplane at the roll attitude indicated in its corresponding schematic drawing. In this series of figures, the wings and ailerons only of the airplane are shown schematically at 62 and 63, respectively, with the instrument being shown in enlarged scale at the center of the wings in being at its proper roll attitude with respect thereto. The aileron controls are for convenience represented by a control stick 64, and the true horizon is indicated by the lines 66.

In FIG. 6, the plane is shown flying with its roll attitude being horizontal and the aileron control stick 64 being in neutral position so as to maintain its attitude. It will also be noted that the plane is in level flight, i.e. neither ascending or descending since the reference lines 38 is exactly centered and parallel to the horizon bar 17. It will also be noted that the reference line 38 is reading 0° bank as may be instantly observed from the graduations 28 and 29. To initiate a left turn, the pilot pushes the control stick 64 to the left so that the ailerons 63 move to the position shown in FIG. 7 to cause the plane to begin to bank left. In doing this, the pilot need only to move the stick to the left until the reference line 38 reads the proper degree of bank indicated on the graduations 29 of the ring 26. It will be noted that while the artificial horizon 17 is at this time horizontal with respect to the attitude of the plane and consequently of the pilot himself, the indicator plate 31 with its aileron reference line 38 has immediately rotated to the desired angle of bank with respect to the artifiicial horizon. As soon as the plane begins to respond, as shown in FIG. 8, the pilot must begin to move his control stick toward its neutral position in order to maintain the reference control line 38 at the chosen degree of bank on the ring 26. This action reduces the angle of the ailerons 63 with respect to the line of flight. When the plane has reached its desired banking position, as shown in FIG. 9, the pilot by this time has gradually moved the control stick to a neutral position so that the plane will maintain this roll attitude. It is important to take note of the fact that, with the plane making a turn in this banking position, the pilot has the false sensation (because of centrifugal force of the plane making a turn) that both he and the plane are level with the earth horizon and that the artificial horizon bar 17 of the instrument panel is tilted with respect to the true horizon. Under these conditions, the novice sometimes makes the mental error of confusing the attitude of the artificial horizon 17 with the attitude of the plane and assumes that his roll attitude is, as for example, in the present instance to the right instead of the left. Acting on this erroneous impression, he will bank the plane further to the left, in attempting to bring the plane back to level. In the practice of the present invention, however, to bring the roll attitude of the plane back to level, the pilot follows one simple rule, that is, "to immediately bring the aileron reference line 38 parallel to the artificial horizon bar 17 and to hold it there," so that the angle of bank read on the ring 26 is 0°. Thus, to bring the plane to level, the pilot moves stick 64 in the manner illustrated in FIG. 10 so as to bring the aileron reference line 38 parallel to the horizon bar 17. In order for the pilot to hold the reference line 38 parallel with the bar 17 and reading 0° bank, he must smoothly move the control stick 64 toward neutral in a manner to keep the artificial horizon 17 level. By the time the airplane has reached level roll attitude, as shown in FIG. 12, the aileron control stick has been moved to the neutral position, with the plane proceeding on level flight.

With regard to the latter part of the above maneuver, (i.e. returning the plane to level roll attitude) it is important to note that the pilot, by keeping the aileron reference line 38 parallel with the artificial horizon 17 is assured that not only is he turning his aileron controls in the right direction, but also that he is bringing his plane back to level attitude in as smooth a manner as possible, and in a manner to prevent any "over control." Thus it will be readily appreciated that not only does this invention have value in instrument flying where the earth horizon is not visible but also as an aid to teach the student how to properly execute a banking maneuver.

The operation of the invention has been here illustrated with the plane executing a turn while in level flight, and the artificial horizon 17, though moving angularly with respect to the gyro horizon 1, has remained centrally located in the front portion thereof. Of course, if the plane is in a climbing or descending attitude in addition to being banked, the artificial horizon will be moved vertically as well as angularly with respect to the gyro horizon instrument as previously described.

Assuming under this circumstance that the pilot wishes to bring his plane back to level flight, the pilot immediately moves his aileron controls from the position shown in FIG. 9 to that shown in FIG. 10. Because of the pitch of the airplane, the artificial horizon 17 will not, as in FIG. 10, be coinciding with the aileron reference line 38 but will be parallel with this line and spaced therefrom. The pilot, while keeping these two lines parallel so as to bring the roll attitude back to level, will also operate his elevator controls so as to move the two lines closer together so that when they coincide, the pitch of the airplane will be level. It will also be noted that, with the provision of the graduations on the ring 26, the pilot may easily maintain the reference line 38 in true parallelism with the horizon bar 17 regardless of the spacing therebetween. Thus the line 38 also provides a very convenient reference for ascertaining and controlling the pitch of the plane.

For simplicity, no discussion of the operation of the other controls of the airplane has been included, it being understood that in executing these maneuvers, the pilot will be making other observations and performing operations in addition to those described herein.

It is thought that the invention will have been clearly understood from the foregoing detailed description. Changes in the details of construction will suggest themselves and may be resorted to without departing from the spirit of the invention, wherefore it is our intention that no limitations be implied and the hereto annexed claims be given a scope fully commensurate with the broadest interpretation to which the employed language admits.

Having thus described the invention what is claimed as new and desired to be secured by Letters Patent is:

1. In combination; pilot operated control means to control the attitude of a vehicle, reference means providing an artificial horizon with respect to which the attitude of said vehicle is to be controlled, said reference means including mechanism to maintain said artificial horizon in a fixed position, an indicator ring, means to mount said ring on said mechanism in a manner to prevent rotational movement between said artificial horizon and said ring but to permit relative vertical movement therebetween, controll indicating means connected to said control means so as to move in the same direction as the vehicle is to be moved, said control indicating means being rotatable in a plane parallel to said ring and about the central axis thereof, and means on said ring for visually indicating the angular displacement between the ring and the control indicating means to indicate the correct functional position of said control means in relation to the vehicle's attitute to bring the attitude of said vehicle into proper relation with said artificial horizon, whereby proper pilot control of said vehicle may be accomplished by operating said control means so as to maintain said control indicating means in proper relation with said artificial horizon and said indicator ring.

2. In an airplane, aileron controls to determine the roll of said airplane, a gyroscope mechanism to indicate a fixed reference axis related to the airplane roll and pitch attitude, said mechanism including an indicator ring, means mounting said ring so as to prevent relative rotation between the ring and said reference axis but to permit relative vertical movement therebetween responsive to the pitch attitude of the airplane, aileron control indicating means connected to the aileron controls so as to move in the same direction as the vehicle is to be moved and associated with said reference axis and said indicator ring in a manner to indicate the correct functional position of said aileron controls to bring the roll of the airplane into proper relation with said reference axis, whereby pilot control may be accomplished by operating the aileron controls so as to maintain said control indicating means in proper relation with said reference axis and said ring and a visual indication of the pitch attitude is obtained by the relative vertical displacement between said ring and said axis.

3. The apparatus according to claim 2 wherein said control indicating means comprises a visual indicator mounted for rotation in a plane parallel to said rings and having line indicating means whose angular displacement relative to said ring corresponds to the degree which said aileron controls are moved from neutral position in order to bring the airplane to the desired roll attitude, so that proper pilot control may be accomplished by operating the aileron controls in a manner to maintain said line indicating means in the desired relation with said reference axis.

4. In an airplane having aileron controls and a gyroscope mechanism which provides an artificial horizon according to which the roll of said airplane is determined, an indicator ring mounted on said mechanism so as to prevent relative rotation between the ring and said artificial horizon but to permit relative vertical movement therebetween responsive to the pitch attitude of the airplane, aileron control indicating means responsive to said aileron controls in a manner that the angular displacement of said control indicating means with respect to said reference axis and said indicator ring corresponds to the degree which said aileron controls are moved from a neutral position, said angular displacement being such in relation to said artificial horizon that proper pilot control is accomplished by operating the aileron controls in a manner to maintain the angular position of said indicating means in relation to said artificial horizon.

5. The device according to claim 4 wherein said control indicating means is superimposed over said ring and said artificial horizon and rotatable in a plane parallel to the general plane of movement of said ring and said artificial horizon and about an axis generally perpendicular to said plane of movement, said control indicating means having line indicating means thereon by which said control indicating means may be visually aligned with said artificial horizon and indicia on said ring.

6. The device according to claim 5 wherein said control indicating means comprises a transparent plate mounted on a display face of said gyroscope mechanism, said plate being operatively connected by cable means to said aileron controls in a manner that movement of said aileron controls cause rotation of said plate.

7. In combination; a pilot operated means to control the attitude of a vehicle, a gyro horizon providing an artificial horizon according to which the roll and pitch of the vehicle are determined, an indicator ring, means to mount said ring on said gyro horizon in fixed rotational position with respect to said artificial horizon but permitting relative vertical movement therebetween responsive to the pitch attitude of the plane, an indicating plate mounted on the front of said gyro horizon in proximity to said artificial horizon and said ring for rotation in a plane approximately parallel to the planes of movement of said ring and said artificial horizon, means connected to said plate and being operatively connected to pilot operated controls in a manner that movement of said controls to move the plane about its longitudinal axis will cause the plate to rotate in the same direction as the plane is to be moved, said plate having a reference line passing through the approximate center thereof and so located as to be level with the horizontal axis of the plane when the controls are in neutral position, whereby the pilot may control the roll attitude of the plane by moving the controls to maintain the desired angular relation between said reference line and said artificial horizon as indicated on said ring.

8. The device according to claim 7 wherein said artificial horizon constitutes a horizon bar spaced from said ring and intersecting a line perpendicular to the plane of said ring and passing through the center of the ring when the vehicle is in level pitch attitude.

No references cited.

MILTON BUCHLER, *Primary Examiner.*

A. H. FARRELL, *Examiner.*